(12) United States Patent
Browne et al.

(10) Patent No.: US 10,922,629 B2
(45) Date of Patent: Feb. 16, 2021

(54) METHODS FOR MANAGING REMOTE ACCESS TO A PHYSICAL LOCATION AND SYSTEMS THEREOF

(71) Applicant: Signature Access Limited, Dingle (IE)

(72) Inventors: Damien Browne, Dingle (IE); Eoin O'Connell, Ardnacrusha (IE); Mihai Penica, Annacotty (IE)

(73) Assignee: SIGNATURE ACCESS LIMITED, Dingle (IE)

( * ) Notice: Subject to any disclaimer, the term of this patent is extended or adjusted under 35 U.S.C. 154(b) by 331 days.

(21) Appl. No.: 14/692,317

(22) Filed: Apr. 21, 2015

(65) Prior Publication Data
US 2016/0314413 A1    Oct. 27, 2016

(51) Int. Cl.
*G07C 9/20* (2020.01)
*G06Q 10/02* (2012.01)
(Continued)

(52) U.S. Cl.
CPC ......... *G06Q 10/02* (2013.01); *G06Q 30/0645* (2013.01); *G06Q 50/163* (2013.01); *G07C 9/20* (2020.01)

(58) Field of Classification Search
CPC .. G06Q 10/02; G07C 9/00; G07C 9/20; G06F 21/00; G06F 21/445
See application file for complete search history.

(56) References Cited

U.S. PATENT DOCUMENTS 6,300,873 B1 * 10/2001 Kucharczyk ......... A47G 29/141
                                                          235/382.5
8,565,725 B2    10/2013 Metivier
(Continued)

FOREIGN PATENT DOCUMENTS

IE       S86896 B2     5/2018
JP     2002358573 A   12/2002

OTHER PUBLICATIONS

Cheong, et al., Secure Encrypted Steganography Graphical Password scheme for Near Field Communication smartphone access control system, Expert Systems with Applications, vol. 41, pp. 3561-3568, 2014 (Year: 2014).*

(Continued)

*Primary Examiner* — Daniel Vetter
(74) *Attorney, Agent, or Firm* — Troutman Pepper Hamilton Sanders LLP (Rochester)

(57) ABSTRACT

A method, non-transitory computer readable medium, and system that manages remote access including receiving a reservation request from a client computing device to access a physical location at a future specified time period secured by one or more remote locking devices. A determination is made on when one or more stored criteria associated with the one or more remote locking devices have been satisfied by the requesting client computing device. An identifier for the requesting client computing device and an access code to unlock the one or more remote locking devices during the future specified time period which is accessible by the one or more remote locking devices without further communication with the remote access management computing device is provided when the determination indicates the one or more stored criteria are satisfied. Additionally, the access code to the requesting client computing device is provided when the determination indicates the one or more stored criteria are satisfied.

18 Claims, 7 Drawing Sheets

(51) Int. Cl.
*G06Q 30/06* (2012.01)
*G06Q 50/16* (2012.01)

(56) References Cited

U.S. PATENT DOCUMENTS

| | | | | |
|---|---|---|---|---|
| 8,606,720 | B1* | 12/2013 | Baker | G06Q 20/00 705/64 |
| 9,683,392 | B1* | 6/2017 | Cheng | E05B 47/0012 |
| 9,875,590 | B2 | 1/2018 | Schmidt-lackner et al. | |
| 2002/0141621 | A1* | 10/2002 | Lane | G06F 21/32 382/124 |
| 2004/0006697 | A1* | 1/2004 | Noyama | H04L 9/32 713/182 |
| 2004/0039919 | A1* | 2/2004 | Takayama | G06Q 20/04 713/180 |
| 2005/0264397 | A1* | 12/2005 | Coelho | G06Q 10/02 340/5.28 |
| 2008/0109900 | A1* | 5/2008 | Kishi | G06F 21/31 726/21 |
| 2009/0132813 | A1* | 5/2009 | Schibuk | G06Q 20/223 713/158 |
| 2011/0112969 | A1* | 5/2011 | Zaid | G06Q 10/02 705/50 |
| 2011/0187493 | A1* | 8/2011 | Elfstrom | G06Q 10/02 340/5.6 |
| 2012/0062362 | A1 | 3/2012 | Rudduck et al. | |
| 2012/0157079 | A1* | 6/2012 | Metivier | G07C 9/00182 455/420 |
| 2012/0158606 | A1* | 6/2012 | Moudy | G06Q 10/083 705/332 |
| 2012/0265988 | A1* | 10/2012 | Ehrensvard | G06F 21/35 713/165 |
| 2013/0008958 | A1* | 1/2013 | Smith | G07C 9/00904 235/382 |
| 2013/0043973 | A1* | 2/2013 | Greisen | G07C 9/00571 340/5.51 |
| 2013/0141587 | A1* | 6/2013 | Petricoin, Jr. | G07C 9/00111 348/156 |
| 2013/0257590 | A1* | 10/2013 | Kuenzi | G05B 1/01 340/5.65 |
| 2014/0195810 | A1 | 7/2014 | Metivier et al. | |
| 2014/0232522 | A1 | 8/2014 | Schmidt-lackner et al. | |
| 2014/0245798 | A1* | 9/2014 | Beckman | E05B 19/00 70/14 |
| 2015/0039357 | A1* | 2/2015 | Segal | G06Q 10/06314 705/5 |
| 2016/0036594 | A1* | 2/2016 | Conrad | H04L 9/3271 713/185 |
| 2016/0055698 | A1* | 2/2016 | Gudmundsson | G07C 9/00142 340/5.52 |
| 2016/0253855 | A1* | 9/2016 | Lowder | G07C 9/00309 455/420 |

OTHER PUBLICATIONS

International Search Report, dated Feb. 8, 2016, for Corresponding U.S. Appl. No. 14/692,317, filed Jan. 4, 2015.
Okidokeys Smart-Lock, "How It Works—A Secure Home Management System Has Never Been This Easy to Use" retrieved from https://www.okidokeys.com/content/6-how-it-works on Apr. 21, 2015.
Finley, "When Wi-Fi Won't Work, Let Sound Carry Your Data", 2018, 4 pages, Retrieved from the Internet: <https://www.wired.com/story/when-wifi-wont-work-let-sound-carry-your-data/>.
Paul, "When IoT Met Blockchain", Jan. 26, 2018, 2 pages, Retrieved from the Internet: <https://www.networkworld.com/article/3250680/internet-of-things/when-iot-met-blockchain.html>.
International Search Report and Written Opinion for corresponding PCT/IB32016/000507, dated Nov. 2, 2017, 7 pages.

* cited by examiner

METHODS FOR MANAGING REMOTE ACCESS TO A PHYSICAL LOCATION AND SYSTEMS THEREOF

FIELD

This technology generally relates to methods and devices for managing locks and, more particularly, to methods for managing remote access to a physical location and systems thereof.

BACKGROUND

Effectively, quickly, and safely managing and providing access to different physical locations for a variety of different situations has been extremely challenging. For example, providing or denying access to vacation renters or to apartment or condo renters is costly and time consuming. Additionally, in large properties, such as assisted living communities, hospitals, military bases, corporate headquarters, and universities, effectively preventing unauthorized access has been a major problem.

In particular, with prior technologies managing and providing access has required a physical presence which costs both time and money and is often inconvenient. Additionally, prior technologies have not been successful in minimizing unauthorized access to physical locations giving rise to prohibited uses of these properties. Further, prior software technologies also have not been able to effectively manage and provide access only to commercial and residential real estate tenants who are current with their payments.

SUMMARY

A method for managing remote access includes receiving by a remote access management computing device a reservation request from a client computing device to access a physical location at a future specified time period secured by one or more remote locking devices. A determination is made by the remote access management computing device on when one or more stored criteria associated with the one or more remote locking devices have been satisfied by the requesting client computing device. An identifier for the requesting client computing device and an access code to unlock the one or more remote locking devices during the future specified time period which is accessible by the one or more remote locking devices without further communication with the remote access management computing device is provided by the remote access management computing device when the determination indicates the one or more stored criteria are satisfied. Additionally, the access code to the requesting client computing device is provided by the remote access management computing device when the determination indicates the one or more stored criteria are satisfied.

A non-transitory computer readable medium having stored thereon instructions for managing remote access includes receiving a reservation request from a client computing device to access a physical location at a future specified time period secured by one or more remote locking devices. A determination is made on when one or more stored criteria associated with the one or more remote locking devices have been satisfied by the requesting client computing device. An identifier for the requesting client computing device and an access code to unlock the one or more remote locking devices during the future specified time period which is accessible by the one or more remote locking devices without further communication with the remote access management computing device is provided when the determination indicates the one or more stored criteria are satisfied. Additionally, the access code to the requesting client computing device is provided when the determination indicates the one or more stored criteria are satisfied.

A remote access management system has at least one remote locking device, a processor coupled to the at least one remote locking device, and a memory coupled to the processor which is configured to be capable of executing programmed instructions comprising and stored in the memory to receive a reservation request from a client computing device to access a physical location at a future specified time period secured by one or more remote locking devices. A determination is made on when one or more stored criteria associated with the one or more remote locking devices have been satisfied by the requesting client computing device. An identifier for the requesting client computing device and an access code to unlock the one or more remote locking devices during the future specified time period which is accessible by the one or more remote locking devices without further communication with the remote access management computing device is provided when the determination indicates the one or more stored criteria are satisfied. Additionally, the access code to the requesting client computing device is provided when the determination indicates the one or more stored criteria are satisfied.

This technology provides a number of advantages including providing methods, non-transitory computer readable medium and devices that more effectively manage remote access to physical locations. With this technology, access to physical locations can be more effectively managed based on one or more stored criteria, such as confirmation of a monthly rent payment or confirmation of an access fee payment to gain access to the physical location. Additionally, with this technology access to physical locations can be safely and quickly be granted or denied for specified periods of time, such as for realtors to show a property or for an emergency provider or maintenance worker to gain access for a limited period of time by way of example. Further, this technology helps to minimize, if not eliminate, in real time unauthorized access to physical locations. Even further, this technology is able to manage and provide access through multiple remote locking devices to grant access to a particular physical location, such as access into a building and then a particular room in that building by way of example only. This technology also is able to monitor and record data relating to each attempt to access a physical location with a registered remote locking device.

DETAILED DESCRIPTION

An environment 10 with an example of a remote access management computing device 12 is illustrated in FIGS. 1-4. In this particular example, the environment 10 includes the remote access management computing device 12, property management computing devices 14(1)-14(n), remote locking devices 16(1)-16(n), lock management server device 18, client computing devices 20(1)-20(n), and communication networks 22, although the environment could include other types and numbers of systems, devices, components, and/or other elements in other configurations. This technology provides a number of advantages including providing methods, non-transitory computer readable medium and devices that more effectively manage remote access to one or more physical locations.

Figure 1:
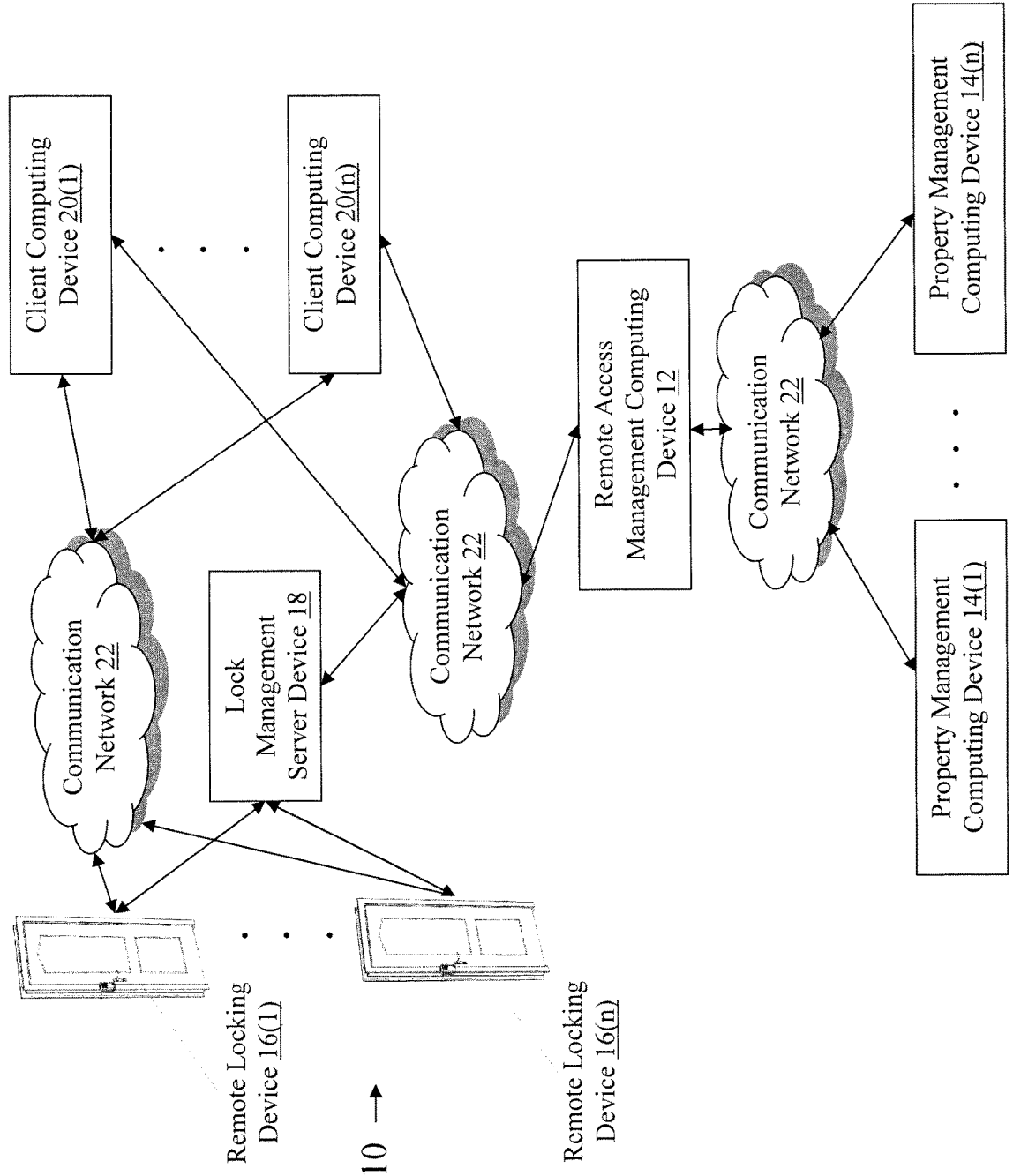
FIG. 1 is a diagram of an environment with an example of a remote access management computing device.
Figure 2:
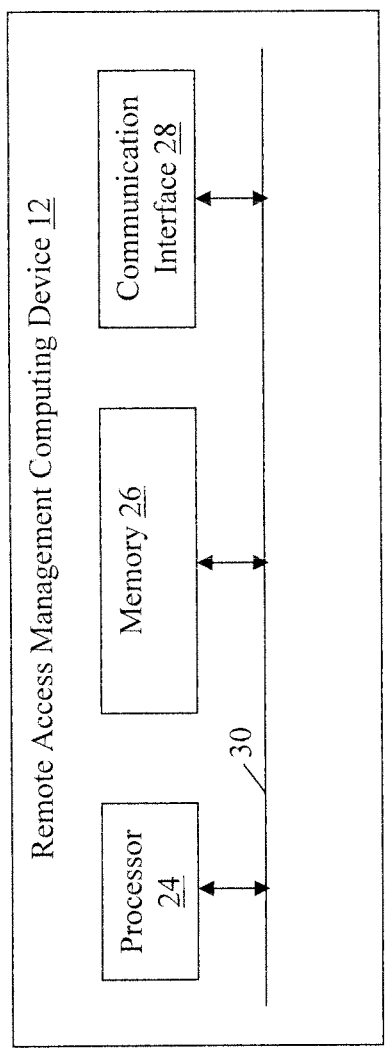
FIG. 2 is a block diagram of an example of the remote access management computing device shown in FIG. 1.

Referring more specifically to FIGS. 1-2, the remote access management computing device 12 manages remote access to one or more physical locations, although this computing device can perform other types and/or numbers of functions and/or other operations. In this particular example, the remote access management computing device 12 includes a processor 24, a memory 26, and a communication interface 28 which are coupled together by a bus 30, although the remote access management computing device 12 may include other types and/or numbers of physical and/or virtual systems, devices, components, and/or other elements in other configurations.

The processor 24 of the remote access management computing device 12 may execute one or more programmed instructions stored in the memory 26 for managing remote access to one or more physical locations as illustrated and described in the examples herein, although other types and/or numbers of instructions can be performed. The processor 24 of the remote access management computing device 12 may include one or more central processing units and/or general purpose processors with one or more processing cores, for example.

The memory 26 of the remote access management computing device 12 stores the programmed instructions and other data for one or more aspects of the present technology as described and illustrated herein, although some or all of the programmed instructions could be stored and executed elsewhere. A variety of different types of memory storage devices, such as a random access memory (RAM) or a read only memory (ROM) in the system or a, hard disk, CD ROM, DVD ROM, or other computer readable medium which is read from and written to by a magnetic, optical, or other reading and writing system that is coupled to the processor 24, can be used for the memory 26.

The communication interface 28 of the remote access management computing device 12 operatively couples and communicates between one or more of the property management computing devices 14(1)-14(n), the remote locking devices 16(1)-16(n), the lock management server device 18, and/or the client computing devices 20(1)-20(n), although other types and/or numbers of communication networks or systems with other types and/or numbers of connections and configurations to other systems, devices components and/or other elements. By way of example only, the communication networks 22 can use TCP/IP over Ethernet and industry-standard protocols, including NFS, CIFS, SOAP, XML, LDAP, SCSI, and SNMP, although other types and numbers of communication networks, can be used. The communication networks 22 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like.

Each of the property management computing devices 14(1)-14(n) may provide instructions and/or data for managing and/or for granting or denying access to lock management server device 18 to unlock one or more remote locking devices 16(1)-16(n) to gain access to one or more physical locations, although each of the property management computing devices 14(1)-14(n) may interact with other types and/or numbers of systems, devices, components, and/or other elements to perform other types and/or numbers of other functions and/or other operations. Each of the property management computing devices 14(1)-14(n) may include a processor, a memory, and a communication interface, which are coupled together by a bus or other link, although other numbers and types of devices and/or nodes as well as other network elements could be used.

Figure 3:
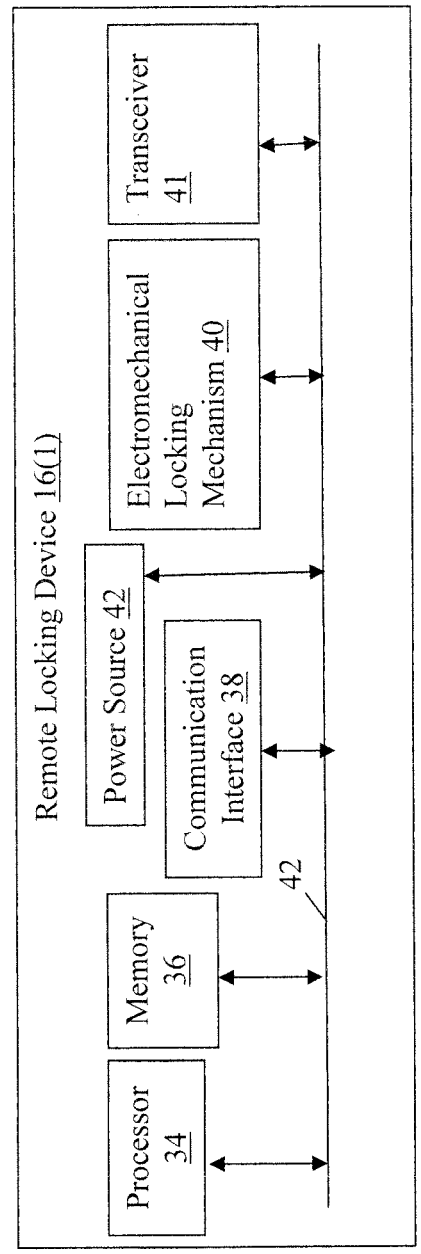
FIG. 3 is a block diagram of an example of the remote locking device shown in FIG. 1.
Figure 4:
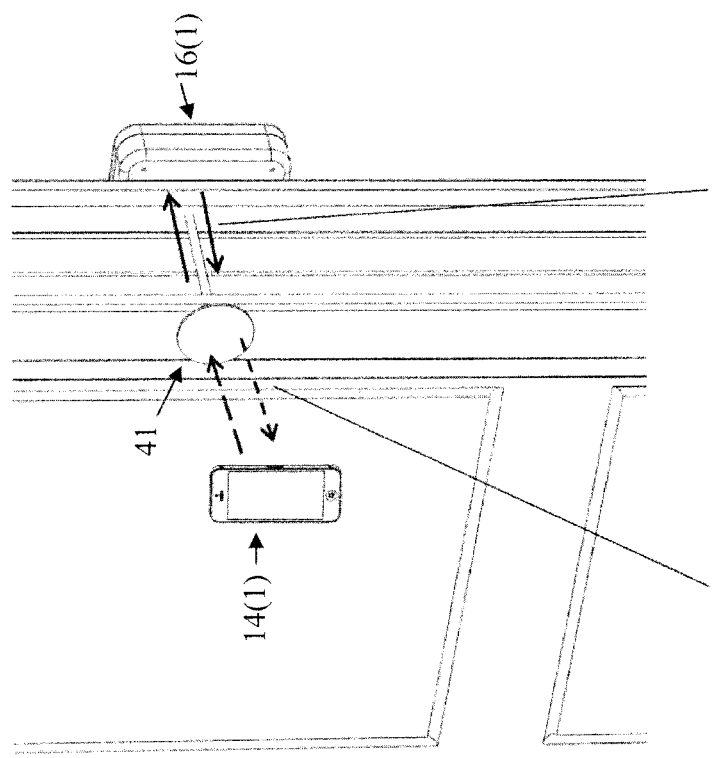
FIG. 4 is a diagram of another example of the remote locking device installed in a door.
Figure 5:
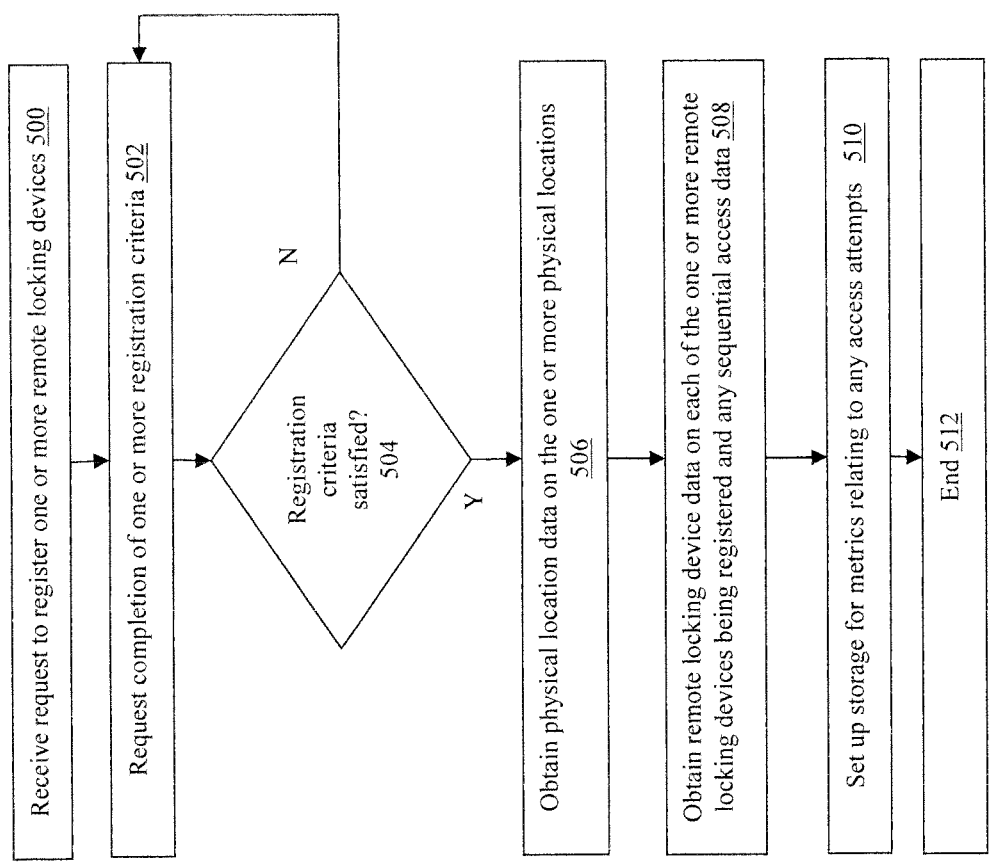
FIG. 5 is a flowchart of an example of a method for registering one or more remote locking devices to manage remote access to one or more physical locations.
Figure 6:
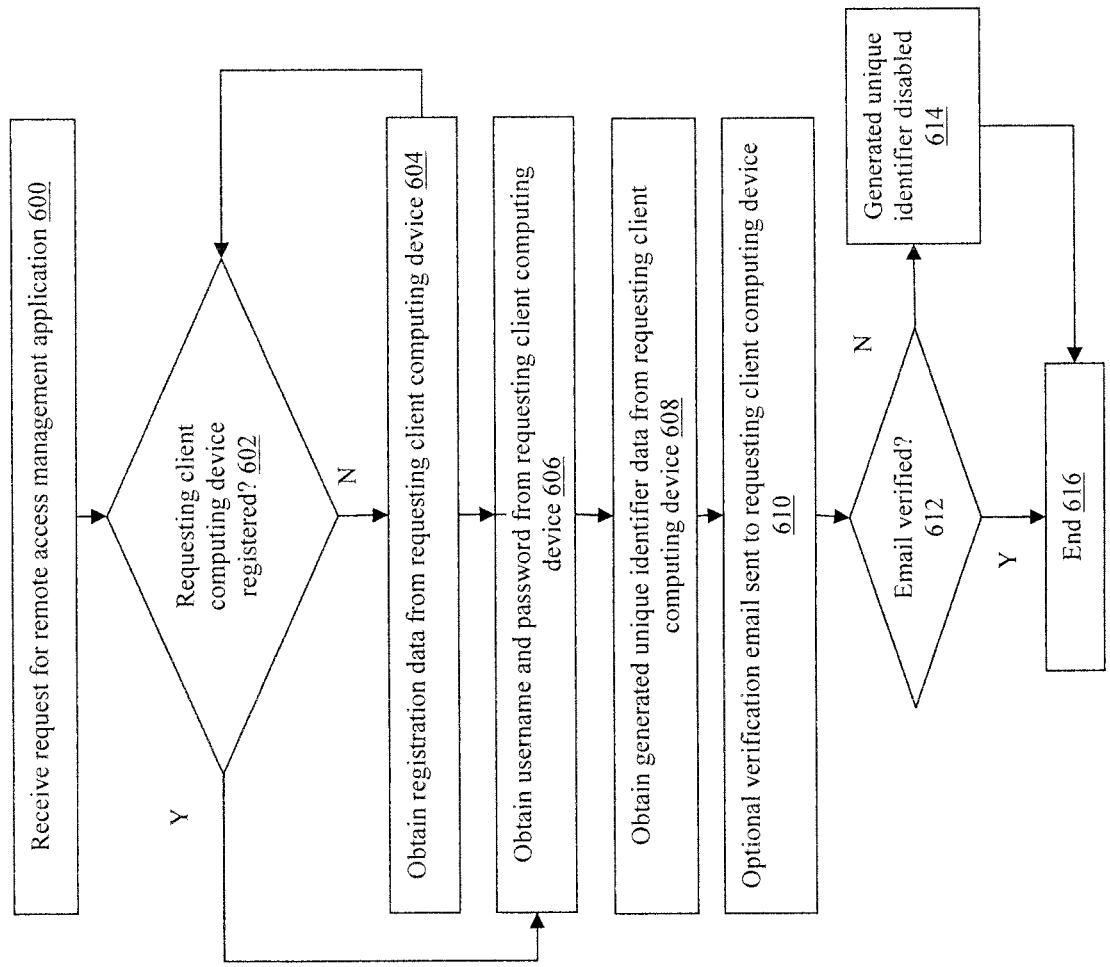
FIG. 6 is a flowchart of an example of a method for registering and providing programmed instructions to one or more client computing devices to manage remote access to one or more physical locations.
Figure 7:
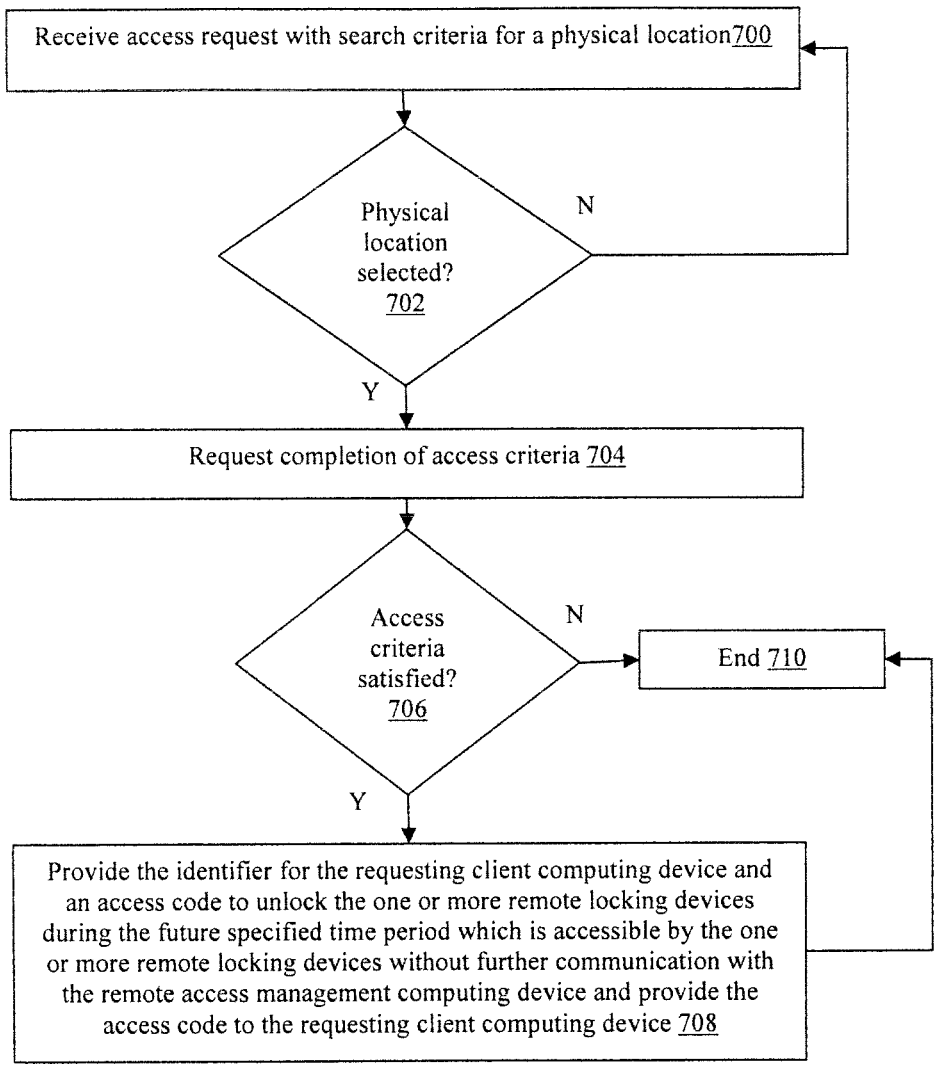
FIG. 7 is a flowchart of an example of a method for executing a reservation process to manage remote access to one or more physical locations.

Referring more specifically to FIGS. 1, 3 and 4, each of the remote locking devices 16(1)-16(n) may be used to securely lock or unlock to provide access at a designated time period to a physical location, although each of the remote locking devices 16(1)-16(n) may perform other types and/or numbers of other functions and/or other operations. An example of one of the remote locking device 16(1) is illustrated in FIG. 4. In this particular example, the other remote locking devices 16(1)-16(n) are the same in the structure and operation as the remote locking device 16(1) except as otherwise illustrated and described herein, although one or more of the remote locking devices 16(1)-16(n) may have other systems, devices, components, and/or other elements in other configurations. Additionally in this particular example, the remote locking device 16(1) may include a processor 34, a memory 36, a communication interface 38, an electromechanical locking mechanism 40, a transceiver 41, and a power source 42 which are coupled together by one or more buses and/or other links or connections, although again each of the remote locking devices 16(1)-16(n) may have other types and/or numbers of other systems, devices, components, and/or other elements in other configurations. Although an electromechanical locking mechanism 40 is shown, other types of locking devices which can be controlled remotely may be used. By way of example only, one of the remote locking devices 16(1) installed in a door with the transceiver 41 on the outside of the door to receive a transmission from the client computing device 16(1) is illustrated in FIG. 4, although other approaches for configuring, installing and/or communicating with one or more of the remote locking devices 16(1)-16(n) could be used.

The optional lock management server device 18 in this example is coupled to, such as by hardwire or wirelessly by way of example, and may be used to manage providing remote access via one or more of the remote locking devices 16(1)-16(n), although the lock management server device 18 may perform other types and/or numbers of other functions or other operations and/or may be coupled to the one or more remote locking devices 16(1)-16(n) in other manners. In this particular example, the lock management server device 18 is located locally at the physical location of the one or more of the remote locking devices 16(1)-16(n), although the lock management server device 18 could be at other locations and/or one or more of the remote locking devices 16(1)-16(n) could be configured to be capable of performing all of the operations of the lock management server device 18 eliminating the need for the lock management server device 18. The lock management server device 18 may include a processor, a memory, and a communication interface which are coupled together by one or more buses and/or other links or connections, although the lock management server device 18 may have other types and/or numbers of other systems, devices, components, and/or other elements in other configurations.

Each of the client computing devices 20(1)-20(n) may make reservation for or other requests to be able to unlock one or more remote locking devices 16(1)-16(n) to gain access to one or more physical locations, although each of the client computing devices 20(1)-20(n) may perform other types and/or numbers of other functions and/or other operations. In this particular example as illustrated in FIG. 4, the client computing device 20(1) is a smartphone, although each of the client computing devices 20(1)-20(n) may comprise other types and/or numbers of other devices, such as tablets, phablets, laptop, and/or personal computers by way of example only. Each of the client computing devices 20(1)-20(n) may include a processor, a memory, and a communication interface, which are coupled together by a bus or other link, although other numbers and types of devices and/or nodes as well as other network elements could be used.

Although the exemplary network environment 10 with the remote access management computing device 12, the property management computing devices 14(1)-14(n), the remote locking devices 16(1)-16(n), the lock management server device 18, the client computing devices 20(1)-20(n), and the communication networks 22 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices, apparatuses, and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

An example of a method for managing remote access to one or more physical locations will now be described with reference to FIGS. 1-8. In particular, first an example of a method for registering one or more remote locking devices to manage remote access to one or more physical locations will now be described with reference to FIGS. 1-5. In step 500, the remote access management computing device 12 may receive a request from one of the property management computing devices 14(1)-14(n) to register a physical location, such as an apartment, house, office building, hospital, school, or other physical property by way of example only, along with the one or more of the remote locking devices 16(1)-16(n) used to secure one or more doors of that particular physical location.

In step 502, the remote access management computing device 12 may request completion of one or more registration criteria by the requesting one of the property management computing device 14(1)-14(n), although other approaches for registration can be used and/or other types of devices may be requested to complete registration. In this particular example, the one of the property management computing device 14(1)-14(n) may be directed to a website hosted by the remote access management computing device 12 to complete registration criteria comprising name, address and completed billing information for a physical location, e.g. a property, for a selected paid period of time to be registered, although other types and/or numbers of other registration criteria may be required for completion.

In step 504, the remote access management computing device 12 determines when the request for completion of the one or more registration requirements has been satisfied. If in step 504 the remote access management computing device 12 determines the request for completion of the one or more registration requirements has not been satisfied by the requesting one of the property management computing devices 14(1)-14(n), then the No branch may be taken back to step 502 to request completion of the one or more registration criteria as described above or this example of the method may end. If in step 504 the remote access management computing device 12 determines the request for completion of the one or more registration requirements has been satisfied by the requesting one of the property management computing devices 14(1)-14(n), then the Yes branch is taken to step 506.

In step 506, the remote access management computing device 12 will request and obtain from the requesting one of the property management computing devices 14(1)-14(n) physical location data on the one or more physical locations being registered. By way of example only, this physical location data on each of the one or more physical locations may comprise data on the specific address of the physical location and doors which may be locked and require permission to access, although other types and/or amounts of data on the one or more physical locations being registered may be requested and obtained.

In step 508, the remote access management computing device 12 will request and obtain from the requesting one of the property management computing devices 14(1)-14(n) data on each of the one or more remote locking devices 16(1)-16(n) at each of the one or more registered physical locations. By way of example only, the data on each of the one or more remote locking devices 16(1)-16(n) at each of the one or more registered physical locations may comprise serial numbers of the one or more remote locking devices

16(1)-16(n) along with data on any required sequence of two or more of the remote locking devices 16(1)-16(n) necessary to access one or more of the registered physical locations.

In step 510, the remote access management computing device 12 configures storage for one or more metrics relating to any access attempts at a registered physical location, such as recording a number of successful and unsuccessful attempts by way of example only. In step 512, this example of the method for registering one or more remote locking devices 16(1)-16(n) to manage remote access to one or more physical locations may end.

Next, an example of a method for registering and providing programmed instructions to one or more client computing devices to manage remote access to one or more physical locations will now be described with reference to FIGS. 1-4 and 6. In step 600, the remote access management computing device 12 may receive a request from one of the client computing devices 20(1)-20(n) for a remote access management application, although the remote access management application may be provided by the remote access management computing device 12 in other manners, such as via a server for a third party application vendor from which the application could be downloaded by way of example only. In this particular embodiment, the remote access management application for one or more of the client computing devices 20(1)-20(n) may comprise one or more programmed instructions configured to be capable of executing one or more aspects of this technology by the one or more of the client computing devices 20(1)-20(n) with the downloaded application as illustrated and described by way of the examples herein.

In step 602, the remote access management computing device 12 may determine when the requesting one of the client computing devices 20(1)-20(n) is registered. If in step 602 the remote access management computing device 12 determines the requesting one of the client computing devices 20(1)-20(n) is not registered, then the No branch is taken to step 604.

In step 604, the remote access management computing device 12 may request, obtain, and store from the requesting one of the client computing devices 20(1)-20(n) registration data, such as a full legal name, address, phone number, email address, and/or billing information by way of example only, although other types and/or amounts of other registration data may be requested, obtained and stored by the remote access management computing device 12.

If back in step 602 the remote access management computing device 12 determines the requesting one of the client computing devices 20(1)-20(n) is registered, then the Yes branch is taken to step 606. In step 606, the remote access management computing device 12 may obtain and store a username and password for a user at the requesting one of the client computing devices 20(1)-20(n).

In step 608, the remote access management computing device 12 may obtain a unique identifier generated by the requesting one of the client computing devices 20(1)-20(n). In this particular embodiment, the requesting one of the client computing devices 20(1)-20(n) executes programmed instructions from the remote access management application that generate the unique identifier from a serial number or International Mobile Station Equipment Identity (MEI) serial number which is obtained and stored by the remote access management computing device 12, although other approaches for generating the unique identifier could be used.

In step 610, the remote access management computing device 12 may optionally transmit a verification email to the email address in the obtained registration data from the requesting one of the client computing devices 20(1)-20(n), although other approaches for verification can be used.

In step 612, the remote access management computing device 12 may determine when the requesting one of the client computing devices 20(1)-20(n) is verified based on an executed action triggered by the verification email, such as an engagement of link in the verification email by way of example only. If in step 612 the remote access management computing device 12 determines the requesting one of the client computing devices 20(1)-20(n) is not verified, then the No branch is taken to step 614 where the generated unique identifier and obtained registration data is disabled from use for remote access, although other types and/or numbers of actions could also be executed. If in step 612 the remote access management computing device 12 determines the requesting one of the client computing devices 20(1)-20(n) is verified, then the Yes branch is taken to step 616 where this particular example of this method may end.

Next, an example of a method for executing a reservation process to manage remote access to one or more physical locations will now be described with reference to FIGS. 1-4 and 7. In step 700, the remote access management computing device 12 may receive a request with one or more search criteria for a physical location from the requesting one of the client computing devices 20(1)-20(n) executing the remote access management application, although other manners for receiving search criteria could be used. In response to the received request, the remote access management computing device 12 may provide one or more physical locations which satisfy the received search criteria to the requesting one of the client computing devices 20(1)-20(n) executing the remote access management application to be displayed by the remote access management application, although other approaches for providing the one or more physical locations which satisfy the received search criteria can be used.

In step 702, the remote access management computing device 12 may determine when one of the one or more physical locations which satisfy the received search criteria has been selected by the requesting one of the client computing devices 20(1)-20(n). If in step 702, the remote access management computing device 12 determines one of the one or more physical locations which satisfy the received search criteria has not been selected, then the No branch is taken back to step 700 as described above, although other steps could be executed such as ending this example of this method.

If back in step 702, the remote access management computing device 12 determines one of the one or more physical locations which satisfy the received search criteria has been selected, then the Yes branch is taken to step 704. In step 704 the remote access management computing device 12 may request completion of one or more access criteria to access the selected physical location from the requesting one of the client computing devices 20(1)-20(n), although other approaches for providing the one or more access criteria may be used. In this particular example, the remote access management computing device 12 may retrieve from memory one or more access criteria which must be satisfied to access the selected physical location. Additionally, the remote access management computing device 12 may request the future time period during which access has been requested from the requesting one of the client computing devices 20(1)-20(n), although other manners for determining the future time period for access may be used, such as retrieving from memory the current future time period that access may be used, e.g. if the access criteria was receipt of the monthly rent payment then access may be granted during the month rent payment was received. The one or more access criteria may comprise a variety of one or more criteria, such as receipt of a payment for access, e.g. a monthly or annual rent or lease payment or an individual payment for short term access, or confirmation that access for a particular individual is authorized based on a stored table of authorized individuals, by way of example only.

In step 706, the remote access management computing device 12 may determine when the one or more access criteria are satisfied by the requesting one of the client computing devices 20(1)-20(n). If in step 706 the remote access management computing device 12 determines the one or more access criteria are not satisfied by the requesting one of the client computing devices 20(1)-20(n), then the No branch is taken to step 710 where this example of this method ends.

If back in step 706 the remote access management computing device 12 determines the one or more access criteria are satisfied by the requesting one of the client computing devices 20(1)-20(n), then the Yes branch is taken to step 708. In step 708, the remote access management computing device 12 provides the one or more access codes for accessing the one or more of the remote locking devices 16(1)-16(n) to access the selected physical location during the specified time period to the requesting one of the client computing devices 20(1)-20(n), although other approaches for providing the access codes and/or other access data may be used. Additionally, the remote access management computing device 12 provides the one or more access codes for accessing the one or more of the remote locking devices 16(1)-16(n) to access the selected physical location during the specified time period and the generated unique identifier for the requesting one or more of the client computing devices 20(1)-20(n) to the lock management server device 18 which is accessible by the one or more remote locking devices 16(1)-16(n) without further communication with the remote access management computing device 12, although other approaches can be used, such as providing the access codes and generated unique identifier with the specified future time period for access directly to the one or more remote locking devices 16(1)-16(n) by way of example only and then this example of this method may end in step 710. If a selected physical location requires access through two or more of the remote locking devices 16(1)-16(n), then the remote access management computing device 12 may also provide access codes for each along with the sequence in which they must be used, although other types and/or amounts of access data may be provided.

Figure 8:
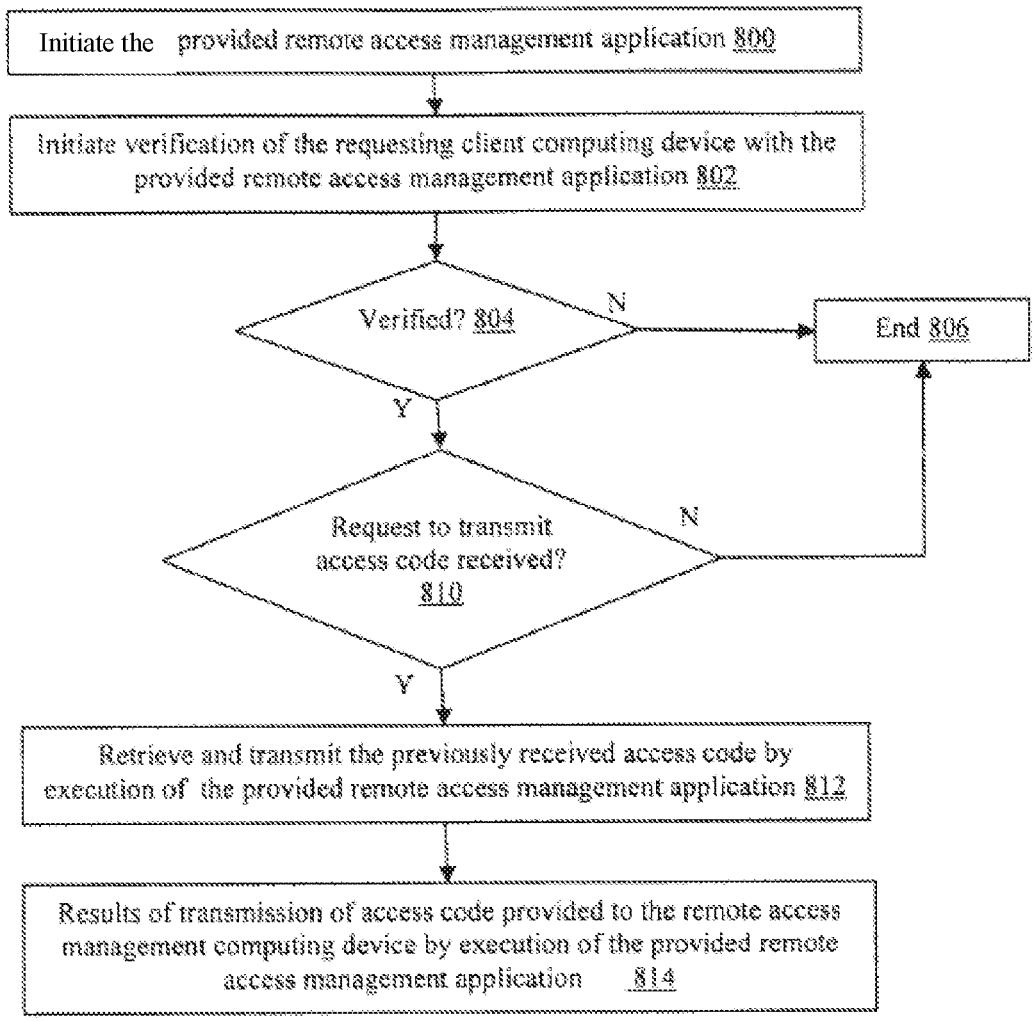
FIG. 8 is a flowchart of an example of a method for managing remote access without further communication with the remote access management computing device.

Next, an example of a method for managing remote access without further communication with the remote access management computing device will now be described with reference to FIG. 8. In step 800, the requesting one of the client computing devices 20(1)-20(n) may initiate the remote access management application to execute programmed instructions to try and access a physical location.

In step 802, the remote access management application may optionally initiate execution of programmed instruction to internally verify that the requesting one of the client computing devices 20(1)-20(n) is authorized to try and continue to access a selected physical location, although other approaches for verification or other authentication may be used.

In step 804 the remote access management application executing on the requesting one of the client computing devices 20(1)-20(n) determines when the requesting one of the client computing devices 20(1)-20(n) is verified to proceed. If in step 804, the remote access management application executing on the requesting one of the client computing devices 20(1)-20(n) determines the requesting one of the client computing devices 20(1)-20(n) is not verified to proceed, such as the application has been transferred to a different computing device and an internal verification code no longer matches by way of example only, then the No branch is taken to step 806 where this example of this method may end.

If back in step 804, the remote access management application executing on the requesting one of the client computing devices 20(1)-20(n) determines the requesting one of the client computing devices 20(1)-20(n) is verified to proceed, then the Yes branch is taken to step 810. In step 810, the requesting one of the client computing devices 20(1)-20(n) determines when a transmission request to broadcast the access code towards the transceiver 41 as shown in the example in FIG. 4 is received. If in step 810, the requesting one of the client computing devices 20(1)-20(n) determines a transmission request to broadcast the access code has not been received, then the No branch is taken after a set period of time and then this example of this method may end at step 806. If in step 810, the requesting one of the client computing devices 20(1)-20(n) determines a transmission request to broadcast the access code has been received, then a Yes branch is taken to step 812.

In step 812, the requesting one of the client computing devices 20(1)-20(n) retrieves the previously received access code and broadcasts the access code along with the generated unique identifier for the requesting one of the client computing devices 20(1)-20(n) via Wi-Fi, Bluetooth, Near Field Communication, an audio encrypted signal, or a light signal by way of example only, to the transceiver 41 of the corresponding one of the remote locking devices 16(1)-16(n). In this particular example, the corresponding one of the remote locking devices 16(1)-16(n), receives the transmitted access code and interacts locally with the lock management server device 18 which has the authorized unique identifiers and access codes to determine when access is granted, although other configurations could be used, such as having the corresponding one of the remote locking devices 16(1)-16(n) managing the access determination. If a selected physical location requires access through multiple remote locking devices 16(1)-16(n), then steps 810 and 812 may be repeated in the stored sequence obtained from the remote access management computing device 12 in the manner described and illustrated above. Each of the remote locking devices 16(1)-16(n) may be configured to transmit back to the requesting one of the client computing device 20(1)-20(n) data on whether or not each access attempt was successful, although other types and/or amounts of other data could be sent, such as a request to retry the transmission of the access code.

In step 812, the results of each access attempt by the requesting one of the client computing devices 20(1)-20(n) may be provided to the remote access management computing device 12 by the remote access management application and stored for future use, although other approaches for monitoring and storing metrics relating to access which can be provided to other entities, such as one or more of the property management computing devices 14(1)-14(n) may be used.

As illustrated and described by way of the examples herein, this technology provides methods, non-transitory computer readable medium and devices that more effectively manage remote access to one or more physical locations. With this technology, access to physical locations can be more effectively managed based on one or more stored criteria, such as confirmation of a monthly rent payment or confirmation of an access fee payment to gain access to the physical location. Additionally, with this technology access to physical locations can be safely and quickly be granted or denied for specified periods of time, such as for realtors to show a property or for an emergency provider or maintenance worker to gain access for a limited period of time by way of example. Further, this technology helps to minimize, if not eliminate, in real time unauthorized access to physical locations. Even further, this technology is able to manage and provide access through multiple remote locking devices to grant access to a particular physical location, such as access into a building and then a particular room in that building by way of example only. This technology also is able to monitor and record data relating to each attempt to access a physical location with a registered remote locking device.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for managing remote access, the method comprising:
   receiving, by an access management computing device, a request for a client device to access a physical location secured by at least one remote locking device during a specified time period;
   determining, by the access management computing device, when one or more stored criteria associated with the at least one remote locking device have been satisfied by the request for the client device;
   providing, by the access management computing device, when the determination indicates the one or more stored criteria are satisfied, a lock access code to the client device and a client identifier, the lock access code, and the specified time period to at least one of the at least one remote locking device or a lock management server device coupled to the at least one remote locking device;
   providing, by the access management computing device, one or more programmed instructions to the client device configured to:
      execute an internal verification within the client device to detect an unauthorized transfer of one or more of the programmed instructions provided to the client device; and
      generate and output an audio encrypted transmission comprising the client identifier and the lock access code to the at least one remote locking device when the internal verification does not detect the unauthorized transfer and the client device initiates a request to unlock the at least one remote locking device;
   providing, by the access management computing device, another one or more programmed instructions to the at least one remote locking device or to the lock management server device, the another one or more programmed instructions configured to:
      determine when to unlock the at least one remote locking device in response to receipt of the audio encrypted transmission based on received access data comprising the client identifier, the lock access code, and the specified time period.

2. The method as set forth in claim 1 further comprising providing, by the remote access management client device, an additional one or more programmed instructions to the client device configured to:
   enable a search for the physical location;
   generate the request to access the physical location secured by the at least one remote locking device; and
   generate one or more criteria responses to satisfy the one or more stored criteria associated with the at least one remote locking device.

3. The method as set forth in claim 1 further comprising recording, by the access management computing device, each attempt to unlock the at least one remote locking device.

4. The method as set forth in claim 1 further comprising registering, by the access management computing device, the at least one remote locking device that secures access to the physical location with the one or more stored criteria in response to a registration request from a property management computing device.

5. The method as set forth in claim 1 wherein the one or more stored criteria further comprises confirmation of a corresponding payment to permit access to the physical location.

6. The method as set forth in claim 1 further comprises providing, by the access management computing device, a separate access code for each of two or more remote locking devices each at different parts of the physical location for use in an operation to unlock the two or more remote locking devices during the specified time period.

7. An access management computing device comprising:
   at least one memory comprising one or more programmed instructions stored thereon; and
   at least one processor coupled to the memory and configured to be capable of executing the stored one or more programmed instructions to:
      receive a request for a client device to access a physical location secured by at least one remote locking device during a specified time period;
      determine when one or more stored criteria associated with the at least one remote locking device have been satisfied by the request for the client device;
      provide, when the determination indicates the one or more stored criteria are satisfied, a lock access code to the client device and a client identifier, the lock access code, and the specified time period to at least one of the at least one remote locking device or a lock management server device coupled to the at least one remote locking device;
      provide another one or more programmed instructions to the client device configured to:
         execute an internal verification within the client device to detect an unauthorized transfer of one or more of the another one or more programmed instructions provided to the client device; and
         generate and output an audio encrypted transmission comprising the client identifier and the lock access code to the at least one remote locking device when the internal verification does not detect the unauthorized transfer and the client device initiates a request to unlock the at least one remote locking device;

provide an additional one or more programmed instructions to the at least one remote locking device or to the lock server management device, the additional one or more programmed instructions configured to:

determine when to unlock the at least one remote locking device in response to receipt of the audio encrypted transmission based on received access data comprising the client identifier, the lock access code, and the specified time period.

8. The device as set forth in claim 7 wherein the processor coupled to the memory is further configured to be capable of executing at least one additional programmed instruction stored in the memory to:

provide a set of one or more programmed instructions to the client device configured to:
enable a search for the physical location;
generate the request to access the physical location secured by the at least one remote locking device; and
generate one or more criteria responses to satisfy the one or more stored criteria associated with the at least one remote locking device.

9. The device as set forth in claim 7 wherein the processor coupled to the memory is further configured to be capable of executing at least one additional programmed instruction stored in the memory to:

record each attempt to unlock the at least one remote locking device.

10. The device as set forth in claim 7 wherein the processor coupled to the memory is further configured to be capable of executing at least one additional programmed instruction stored in the memory to:

register the at least one remote locking device that secures access to the physical location with the one or more stored criteria in response to a registration request from a property management computing device.

11. The device as set forth in claim 7 wherein the one or more stored criteria further comprises confirmation of a corresponding payment to permit access to the physical location.

12. The device as set forth in claim 7 wherein the processor coupled to the memory is further configured to be capable of executing at least one additional programmed instruction stored in the memory to:

provide a separate access code for each of two or more remote locking devices each at different parts of the physical location for use in an operation to unlock the two or more remote locking devices during the specified time period.

13. A non-transitory computer readable medium having stored thereon instructions comprising executable code which when executed by one or more processors, causes the one or more processors to:

receive a request for a client device to access a physical location secured by at least one remote locking device during a specified time period;
determine when one or more stored criteria associated with the at least one remote locking device have been satisfied by the request for the client device;
provide, when the determination indicates the one or more stored criteria are satisfied, a lock access code to the client device and a client identifier, the lock access code, and the specified time period to at least one of the at least one remote locking device or a lock management server device coupled to the at least one remote locking device;

provide one or more programmed instructions to the client device configured to:
execute an internal verification within the client device to detect an unauthorized transfer of one or more of the programmed instructions provided to the client device; and
generate and output an audio encrypted transmission comprising the client identifier and the lock access code to the at least one remote locking device when the internal verification does not detect the unauthorized transfer and the client device initiates a request to unlock the at least one remote locking device;

provide another one or more programmed instructions to the at least one remote locking device or to the lock management server device, the another one or more programmed instructions configured to:
determine when to unlock the at least one remote locking device in response to receipt of the audio encrypted transmission based on received access data comprising the client identifier, the lock access code, and the specified time period.

14. The medium as set forth in claim 13 wherein the executable code when executed by the one or more processors further causes the one or more processors to:

provide an additional one or more programmed instructions to the client device configured to:
enable a search for the physical location;
generate the request to access the physical location secured by the at least one remote locking device; and
generate one or more criteria responses to satisfy the one or more stored criteria associated with the at least one remote locking device.

15. The medium as set forth in claim 13 wherein the executable code when executed by the one or more processors further causes the one or more processors to:

record each attempt to unlock the at least one remote locking device.

16. The medium as set forth in claim 13 wherein the executable code when executed by the one or more processors further causes the one or more processors to:

register the at least one remote locking device that secures access to the physical location with the one or more stored criteria in response to a registration request from a property management computing device.

17. The medium as set forth in claim 13 wherein the one or more stored criteria further comprises confirmation of a corresponding payment to permit access to the physical location.

18. The medium as set forth in claim 13 wherein the executable code when executed by the one or more processors further causes the one or more processors to:

provide a separate access code for each of two or more remote locking devices each at different parts of the physical location for use in an operation to unlock the two or more remote locking devices during the specified time period.

\* \* \* \* \*